United States Patent [19]
Haldimann

[11] Patent Number: 6,070,716
[45] Date of Patent: Jun. 6, 2000

[54] CHAIN CONVEYOR

[75] Inventor: Hans-Rudolf Haldimann, Lugano, Switzerland

[73] Assignee: Gilgen Fordersysteme AG, Oberwangen, Switzerland

[21] Appl. No.: 08/750,907

[22] PCT Filed: May 22, 1996

[86] PCT No.: PCT/CH96/00198

§ 371 Date: Oct. 31, 1997

§ 102(e) Date: Oct. 31, 1997

[87] PCT Pub. No.: WO96/37422

PCT Pub. Date: Nov. 28, 1996

[30] Foreign Application Priority Data

May 26, 1995 [CH] Switzerland ............... 1562/95

[51] Int. Cl.[7] .............. B65G 17/06; B65G 15/60
[52] U.S. Cl. ........................... 198/851; 198/838
[58] Field of Search ................... 198/838, 840, 198/845, 851

[56] References Cited

U.S. PATENT DOCUMENTS

| | | | |
|---|---|---|---|
| 3,635,327 | 1/1972 | Thiessen | 198/750.1 X |
| 3,805,947 | 4/1974 | Ward | 198/838 X |
| 4,358,010 | 11/1982 | Besch | 198/838 |
| 5,042,647 | 8/1991 | Tyler et al. | 198/845 X |
| 5,103,968 | 4/1992 | Skarlupa | 198/838 X |
| 5,538,384 | 7/1996 | Haldimann | 198/838 X |

*Primary Examiner*—Christopher P. Ellis
*Assistant Examiner*—Gene O. Crawford
*Attorney, Agent, or Firm*—Tarolli, Sundheim, Covell, Tummino & Szabo L.L.P.

[57] ABSTRACT

The chain conveyor comprises a roller chain and a supporting rail adapted to vertically support the roller chain. The roller chain is provided with a plurality of roller members which are connected to each other by means of strap members. In order to laterally guide the roller chain with respect to the supporting rail, discrete guide elements are provided. These guide elements comprise a guide cam which protrudes the strap members of the upper run of the roller chain downwards towards the supporting rail. Moreover, the guide elements comprise supporting pin members which laterally project from the guide elements. The guide elements are located between the roller members and fixed to the strap members. The guide cam engages a longitudinal groove provided at the top of the supporting rail, while the lateral supporting pin members vertically support the lower run of the roller chain with the help of auxiliary rail members provided on the supporting rail.

20 Claims, 7 Drawing Sheets

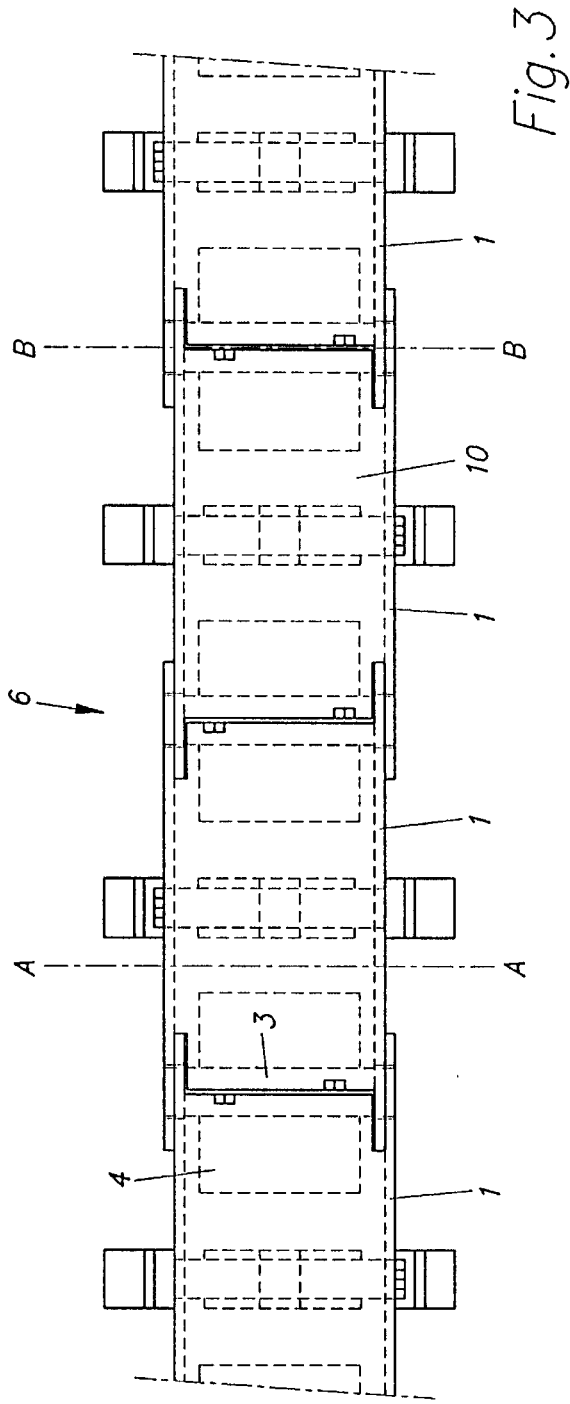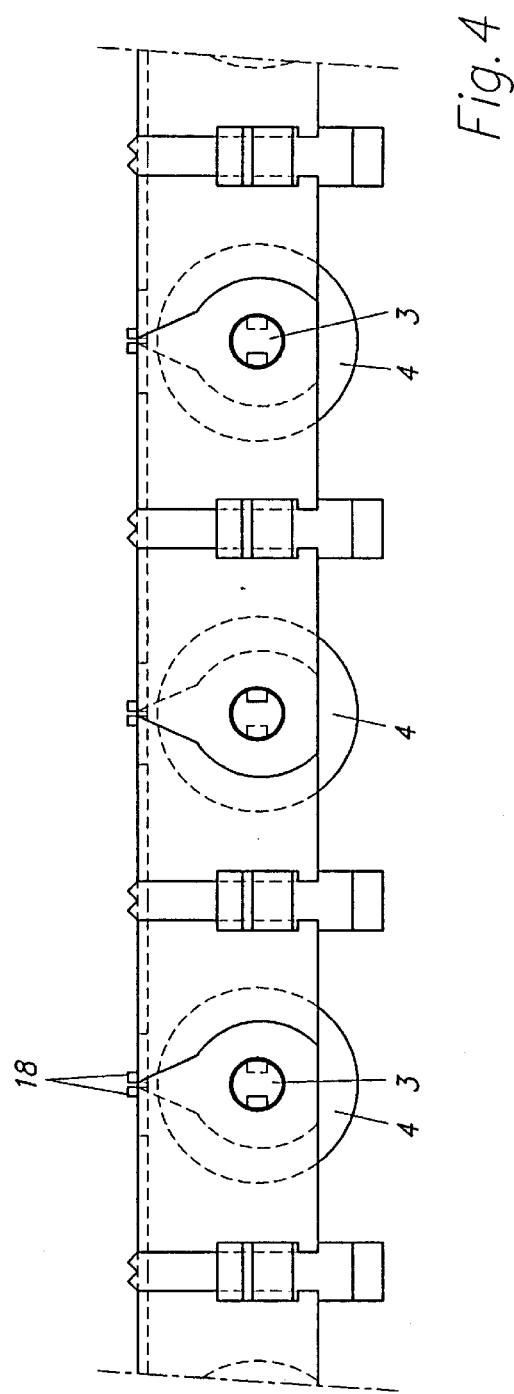

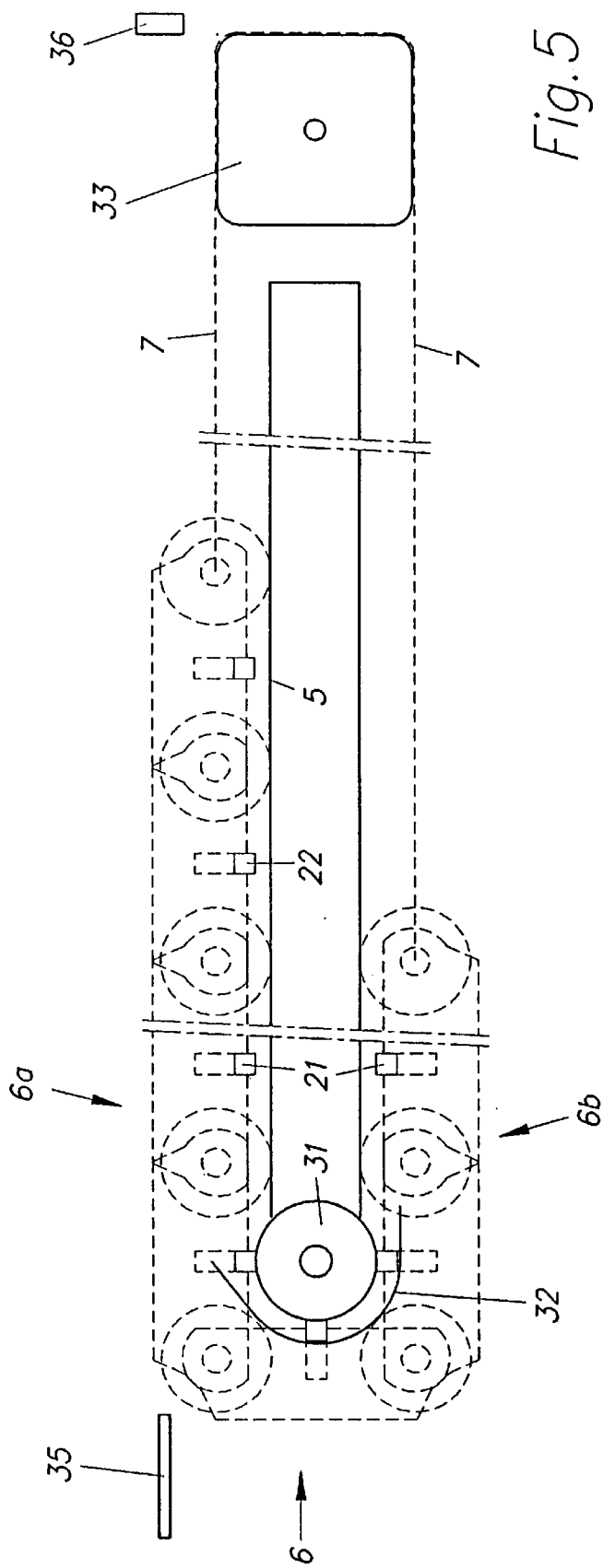

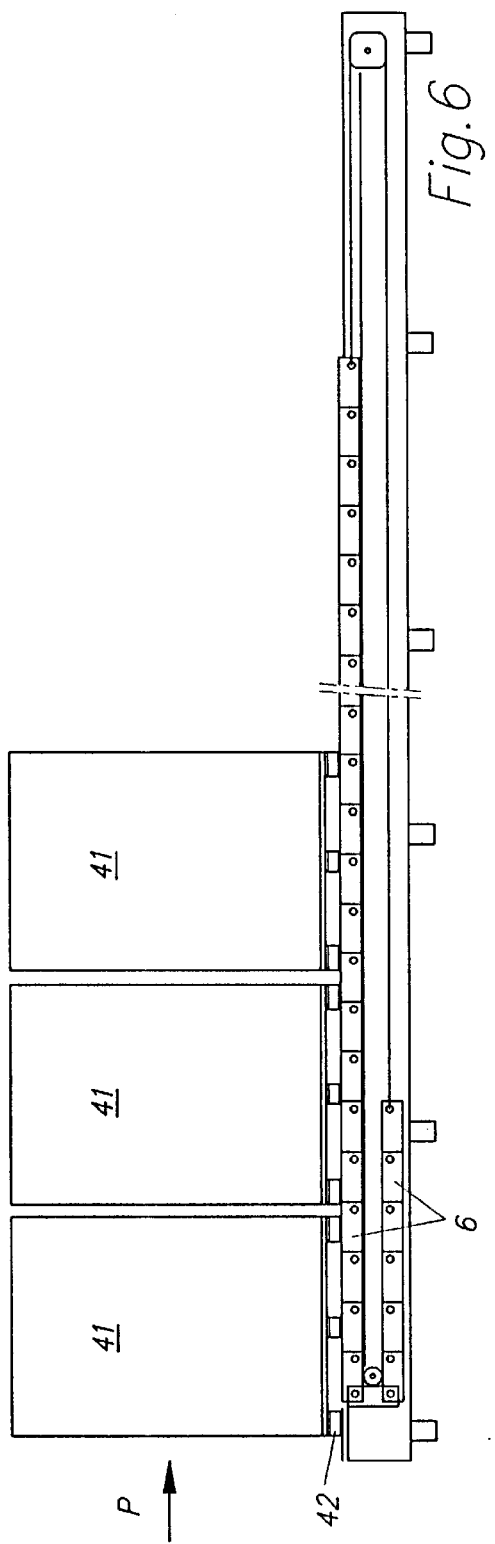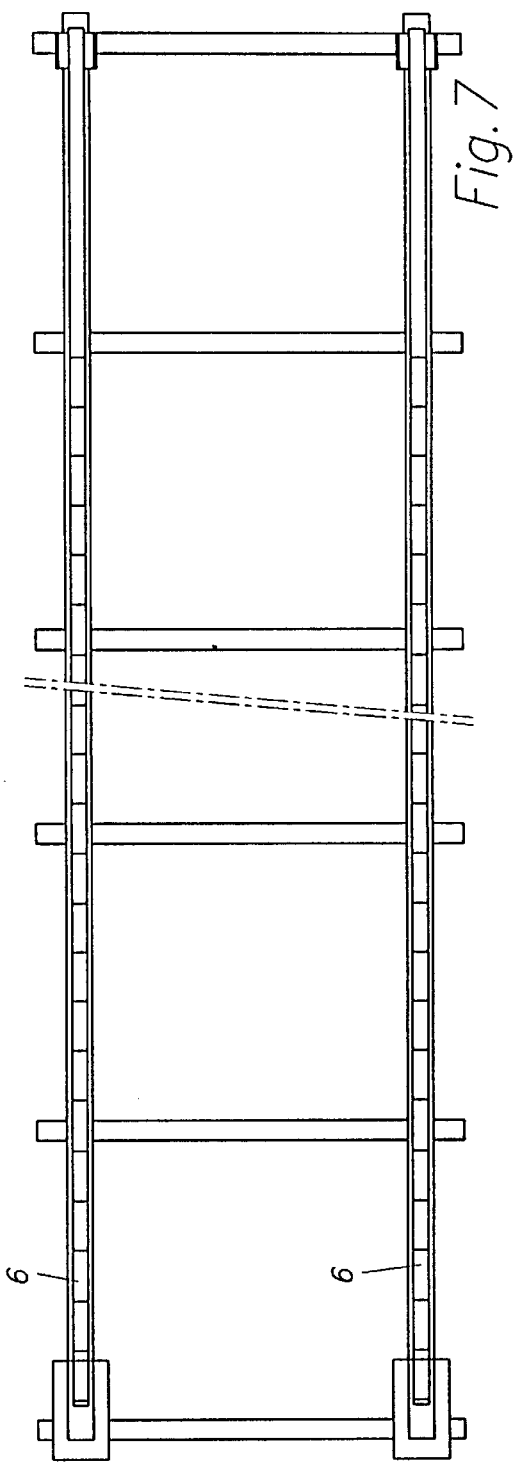

CHAIN CONVEYOR

FIELD OF THE INVENTION

The present invention relates to a chain conveyor comprising a roller chain and a supporting rail for vertically supporting the roller chain. The roller chain includes a plurality of roller members which are interconnected in an articulated manner by a plurality of strap members. The roller chain further comprises means for laterally guiding the roller chain with respect to the supporting rail.

Chain conveyors of this kind are used for instance in the storage racks of rack storage facilities where they serve as a conveying means for the goods to be stored in these racks. Thereby, the conveying means usually is a conveyor chain provided with a plurality of rollers; both ends of this chain are interconnected by means of a belt member to form an endless loop. The goods to be stored are placed on pallets in most cases.

In the case, where goods have to be fed into the storage facility, i.e. have to be put into a specific rack, the pallets are placed onto the conveyor chain and pushed into the rack, e.g. by means of a fork lift truck. In the opposite case, when goods have to be removed from the rack, the fork lift truck engages the frontmost pallet and pulls it out of the rack, whereby the conveyor chain is displaced towards the end of the rack such that other pallets which have been placed previously onto the conveyor chain are moved towards the input/output end of the rack, too.

One difficulty observed in connection with such chain conveyors is, on the one hand, that the overall friction, in particular the friction of the conveyor chain with respect to the supporting rail, must be kept as low as possible. On the other hand, particularly in the case of comparatively long racks, the conveyor chain must be laterally guided as exactly as possible in order to avoid that the conveyor chain is not derailed with respect to the supporting rail and, moreover, in order that the width of the rack channel can be kept as low as possible to make the best use of the available room.

PRIOR ART

In the document WO 94/000370, corresponding to U.S. Pat. No. 5,538,384, a chain conveyor is disclosed which takes into account the aforementioned problems. For this purpose, the chain conveyor according to that document comprises a roller chain whose support rollers are interconnected in pairs on both sides by means of a pair of strap members. These strap members project downwards to such an extent that they guide the upper run of the roller chain laterally along the supporting rail. It is understood that the supporting rail must be smaller in width than the distance between the pair of strap members. The lower portion of the supporting rail is provided with a closed hollow return channel in which the lower run of the conveyor chain is received, guided and vertically supported.

A problem connected with the chain conveyor according to the above mentioned document may be seen in the fact that the lateral strap members of the roller chain must pick up both tractive forces and guide forces. If the lateral strap members are made of a material having good self-lubricating properties, for instance PTFE or polyethylene, either their tensile strength is not sufficient or they have to be designed with very large cross sectional areas with the result that the manufacturing costs are substantially increased. If these parts are made of composite materials, the manufacturing costs are even higher. On the other hand, if they are manufactured of steel, this involves the drawback that the friction between roller chain and guide rail is quite high.

This is particularly true for the lower run of the chain which is received in the closed return channel, because additionally the dead load of the roller chain has to be picked up by the lateral strap members, too. Due to the high friction values occurring between conveyor chain and supporting rail, the maximum length of such a chain conveyor is limited. Moreover, practice has shown that the frictional values are further increased by the tractive load on the strap members which simultaneously serve as guide elements.

OBJECTS OF THE INVENTION

Thus, it is an object of the invention to provide a chain conveyor which avoids the drawbacks mentioned above in connection with the prior art.

Particularly, it is an object of the invention to provide a chain conveyor which presents particularly low frictional values between roller chain and supporting rail, which is simple in design and which can be manufactured with comparatively low costs.

SUMMARY OF THE INVENTION

In order to meet these and other objects, the invention provides a chain conveyor comprising a roller chain and a supporting rail for vertically supporting the roller chain. The roller chain includes a plurality of rollers which are interconnected in an articulated manner by a plurality of strap members. The roller chain further comprises a plurality of guide members for laterally guiding the roller chain with respect to the supporting rail. The guide members are constituted by discrete guide elements which are located between the roller members and fixedly connected to the strap members.

Due to the fact that the guide means are constituted by discrete guide elements fixed to the strap members, a strict separation of the tasks is ensured, i.e. the strap members only have to pick up tractive forces and have not to do any guiding jobs, while the discrete guide elements are not subjected to any tractive forces, but have to meet only guiding tasks. The result is that both the strap members and the guide elements can be optimally designed for their job and no compromises have to be observed as far as the design and material of both the strap members and the guide elements are concerned.

According to a preferred embodiment, the strap members, as seen in a cross sectional view, are of generally U-shaped design, comprising two leg members as well as a base portion located therebetween, whereby the base portion of the strap members of the upper run of the roller chain are directed towards the top. As a result of the U-shaped design and the of the fact that the base portion of the strap members of the upper run of the roller chain are directed towards the top, the roller chain as well as the top bearing surface of the supporting rail are protected from contamination to a far extent, particularly in the case, as provided according to a further preferred embodiment, if the mean length of the base portion of the strap member at least approximately corresponds to the distance between the centers of two consecutive roller members.

According to a still further preferred embodiment, the roller chain comprises a plurality of uniform strap members, whereby consecutive strap members are rotated by 180° with respect to each other around their z-axis and laterally offset to each other by an amount corresponding to the thickness of the walls of the leg members. This embodiment of the roller chain may be manufactured particularly easily and at low costs, because only one type of strap members has to be provided.

BRIEF DESCRIPTION OF THE DRAWINGS

In the following, embodiments of the chain conveyor according to the invention will be further described, with reference to the accompanying drawings, in which:

FIG. 3 shows a top view of a portion of a roller chain;

FIG. 4 shows a side view of a portion of a roller chain;

FIG. 5 shows a schematic view of a chain conveyor;

FIG. 6 shows a side view of a schematically illustrated chain conveyor;

FIG. 7 shows the chain conveyor in a top view;

DETAILED DESCRIPTION OF PREFERRED EMBODIMENTS

Figure 1A:
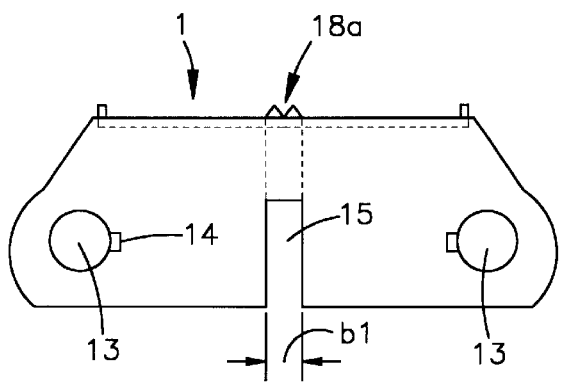
FIG. 1a shows a first embodiment of a single strap member for a roller chain in a side view.
Figure 1B:
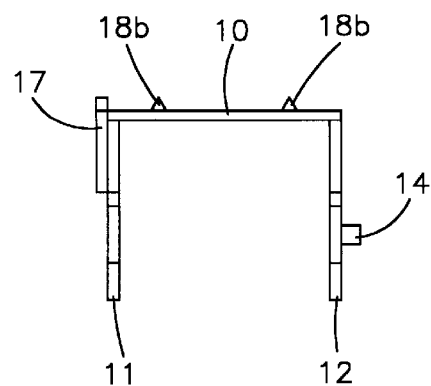
FIG. 1b shows a first embodiment of a single strap member for a roller chain in a front view.
Figure 1C:
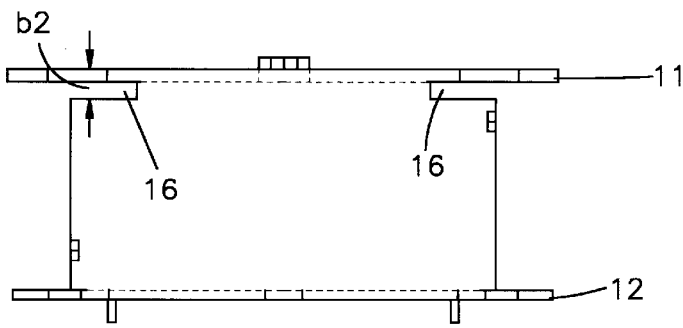
FIG. 1c shows a first embodiment of a single strap member for a roller chain in a top view.

FIGS. 1a, 1b, and 1c show a strap member 1 for a roller chain in a side view, in a front view and in a top view. The strap member 1 is of generally U-shaped configuration and comprises a base portion 10 as well as two leg portions 11 and 12. The base portion 10 located between the two leg portions 11, 12 thereby constitutes the upper cover of the strap member 1. Both leg portions 11, 12 of the strap member 1 are provided with bores 13 which serve for receiving shaft members to bear support rollers. Moreover, fixing elements 14 are provided which protrude outwardly and can be plastically bent inwardly for fixing the shaft members in their operating positions.

In the centers of the leg portions 11, 12, there are provided rectangular recesses 15 which serve for receiving guide elements, whereby the arrangement of the shaft members as well as the design and arrangement of the guide elements will be described in detail herein after.

The base portion 10 of the strap member 1 is provided with two slots 16 running along and close to one of the leg portions 11. The width b2 of the slots 16 is greater than the wall thickness of the leg portions 11 and 12, respectively. By means of these slots 16, the assembling of a plurality of strap members 1 to a chain is rendered possible, because one of the leg portions 11, 12 of a leading or lagging strap member 1 engages such a slot 16. In the region of the recess 15 provided in the rear leg portion 11, the strap member 1 comprises a lateral arm member 17 which is bent upwards and provided with spikes 18a at its end face. Further spikes 18b are provided on the top surface of the strap member 1. The base shape of such a strap member 1 is created preferably by a punching operation, while the U-shaped design can be realized by bending the punched-out part.

Figure 2A:
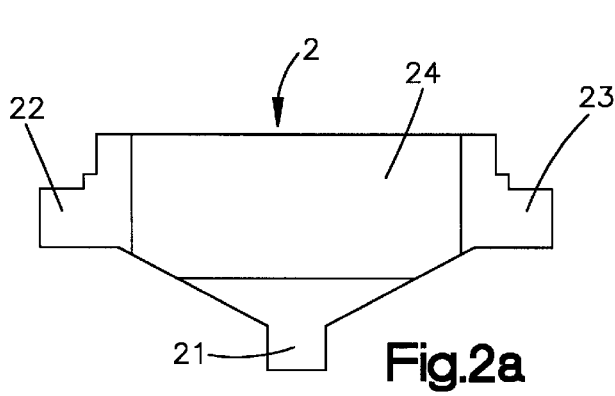
FIG. 2a shows a guide element in a front view.
Figure 2B:
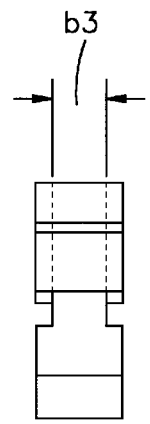
FIG. 2b shows a guide element in a side view.
Figure 2C:
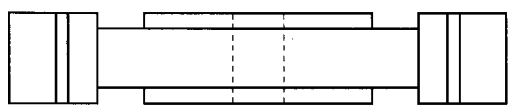
FIG. 2c shows a guide element in a top view.

FIGS. 2a, 2b, and 2c show a guide element 2 in a side view, in a front view and in a top view. The guide element 2 has a substantially T-shaped configuration, even if it is slightly asymmetric. The guide element 2 is provided on both sides each with a supporting pin member 22 and 23, respectively. The left supporting pin member 22 is shorter than the right supporting pin member 23 by an amount which corresponds to the thickness of the wall of the leg portions 11, 12 of the strap member 1 (cf. FIG. 1a). At the bottom, the guide element 2 comprises a guide cam member 21. The central portion 24 of the guide element 2 has a width b3 which is adapted to the width b1 of the rectangular recesses 15 in the leg portions 11, 12 of the strap member 1 (cf. FIG. 1a), such that the guide element 2 can be fixed to the two leg portions 11, 12 of the strap member 1. In order to ensure that the guide element 2 can be reliably fixed to the strap member 1 and to its leg portions 11, 12, respectively, the guide element 2 can be provided with snap-in or clamping members known per se in the art and not shown in the drawings.

FIG. 3 shows a portion of a roller chain 6 in a top view, and FIG. 4 shows the same portion of the roller chain 6 in a side view. The roller chain 6 comprises a plurality of strap members 1 and guide members 2. Each strap member 1 is provided with a roller 4 connected thereto by means of a shaft member 3. The roller chain 6 is set up of a plurality of uniform strap members 1, whereby consecutive strap members 1 are rotated by 180° with respect to each other around their z-axis and laterally offset to each other by an amount corresponding to the thickness of the walls of the leg portions 11, 12. For interconnecting adjacent strap members 1, use is made of the shaft members 3 also serving for receiving the rollers 4. The shaft members 3 can be fixedly secured in their associated bores 13 by means of lock members 14 (cf. FIG. 1c).

As already mentioned, the guide elements 2 are received in the rectangular recesses 15 provided in the leg portions 11 and 12 (cf. FIG. 1c). The fixing of the guide elements 2 to the leg portions 11, 12 can be achieved by clamping them into the rectangular recesses 15; however, it is also possible to provide e.g. snap-in elements or similar means known per se in the prior art and not shown in the drawings.

The upwardly protruding spikes 18 serve, as is well known to any person skilled in the art, for the transmission of forces between the roller chain 6 and the goods supported e.g. by a wooden pallet to be handled by the chain conveyor. Because the spikes 18 penetrate the wood of the pallets, a reliable positive connection between pallet and roller chain 6 is ensured by the provision of these spikes 18.

Moreover, as can be seen in FIG. 3, the roller chain 6 has a substantially closed upper surface. This is achieved by the fact that the length of the base portion 10 of each strap member 1 at least approximately corresponds to the distance between the shaft members 3 of two consecutive rollers 4.

FIG. 5 illustrates in a schematic view an example of a realization of a chain conveyor. The chain conveyor shown in FIG. 5 comprises a roller chain 6, a supporting rail 5, tail or deflection roller members 31, 33, guide members 32 as well as a run-out rail member 35. The two free ends of the roller chain 6 are connected to each other by means of a belt 7 to form an endless conveyor loop running around the two tail or deflection rollers 31 and 33. As the roller chain 6 has to support loads only at the top side of the supporting rail member 5, it is sufficient that approximately only half of the length of the endless conveyor loop is constituted by the roller chain 6. Such a design reduces costs and weight and, moreover, decreases overall friction.

The tail roller member 31 shown in FIG. 5 at the left side is of essentially circular configuration, as seen in a cross sectional view, while the tail roller member 33 shown in FIG. 5 at the right side has the configuration of a square with rounded corners, also as seen in a cross sectional view. Such a design of the right hand tail roller 33 serves for the compensation of length variations of the running conveyor loop, because a polygon effect with the period of the length of a single strap member 1 is observed during the deflection of the roller chain around the right hand tail roller 33.

At its left side, as seen in FIG. 5, the chain conveyor is provided with guide rail members 32 located in the region of the tail roller member 31; these guide rail members 32 serve, on the one hand, to favor the deflection of the roller chain 6 around the tail roller member 31 and, on the other hand, to take up the centrifugal forces observed when the roller chain is moved with high speed. Particularly, during the deflection of the roller chain 6 by means of the tail roller member 31, the top sides of the supporting pin members 21, 22 of the guide elements 2 engage the aforementioned guide rail members 32.

The roller chain 6 is separated into an upper run 6a and a lower run 6b of the chain 6 by the left hand tail roller member 31. At the front end of the chain conveyor at the left side of FIG. 5, i.e. at the end where the goods to be conveyed are fed to the roller conveyor and also discharged therefrom, there is provided a run-out rail member 35. The run-out rail member 35 serves for absorbing surplus kinetic energy of the system during the discharge of goods in such a way that the goods supported by the roller chain 6 can run out on this rail member 35. The length, nature and surface characteristic of this run-out rail member 35 depends, amongst else, on the maximum speed of the roller chain 6 during the discharge of goods and the weight of these goods. At the opposite end of the chain conveyor, a stop member 36 is provided. However, instead of a stop member 36, another run-out rail member similar to the run-out member 35 could be provided.

FIG. 6 shows a side view of a schematically illustrated chain conveyor, while FIG. 7 shows the same chain conveyor in a top view. In FIG. 6, three pallets 42 loaded with goods 41 are illustrated, which are supported by the roller chain 6 and can be displaced thereby in both directions, i.e. to the left and to the right, as seen in FIG. 6. In order to place another pallet onto the roller chain 6, such further pallet is pushed in, preferably by means of a fork lift truck, in the direction of the arrow P in FIG. 6, i.e. at the feed side of the conveyor. Thereby, all the pallets 42 and, therewith, all the goods loaded thereon are displaced to the right, as seen in FIG. 6, by the force exerted to the leftmost pallet 42 by means of the fork lift truck. In other words, as soon as the new pallet to be put onto the roller chain 6 touches the leftmost pallet 42, the latter one is displaced to the right and therewith all remaining pallets 42 located on the roller chain. The spikes protruding from the top of the roller chain 6 (not shown in FIG. 6) ensure a positive coupling between the roller chain 6 and the pallets 42 disposed thereon. Furthermore, it can be seen in FIG. 7 that a conveyor system as described above comprises two chain conveyors arranged parallel to each other in a certain distance approximately corresponding to somewhat less than the width of a pallet 42.

Figure 8:
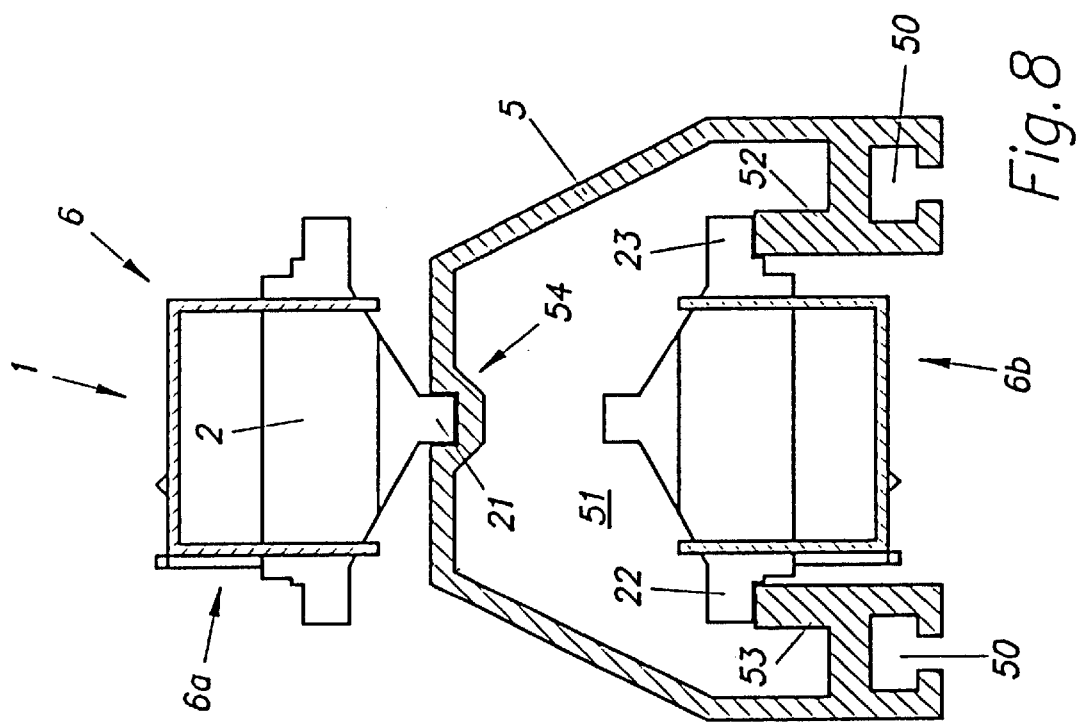
FIG. 8 shows a first cross sectional view of a supporting rail and of the roller chain taken along the line A—A in FIG. 3.

FIG. 8 shows a first cross sectional view of a supporting rail member 5 and of the roller chain 6 of the chain conveyor taken along the line A—A in FIG. 3. The supporting rail member 5 is provided, at its top, with a guide groove 54. The guide cam 21 provided on the guide element 2 engages the guide groove 54 such that the entire roller chain 6 is laterally guided. As can be further seen in FIG. 8, the supporting rail member 5 is provided with a hollow space 51 which is open at its bottom. In the interior of the hollow space 51, two auxiliary rail members 52, 53 are provided on which rest the supporting pins 22, 23 of the guide element 2 in order to vertically support the lower run 6b of the roller chain 6 and to laterally guide it. Two T-shaped grooves 50 provided in the lower region of the supporting rail member 5 serve for fixing the supporting rail member 5 to a suitable base frame structure (not shown). It is understood that it is also possible to provide the side surfaces of the supporting rail member 5 with similar T-shaped grooves if it is more convenient to fix the entire supporting rail member 5 at a vertically extending frame structure.

Figure 9:
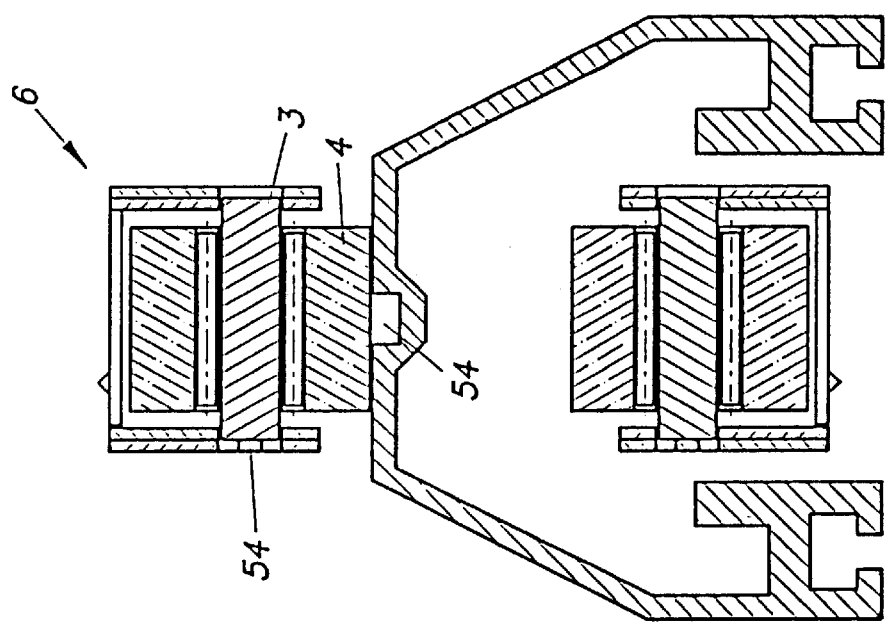
FIG. 9 shows a second cross sectional view of a supporting rail and of the roller chain taken along the line B—B in FIG. 3.

FIG. 9 shows a second cross sectional view of a supporting rail member 5 and of the roller chain 6 taken along the line B—B in FIG. 3. In this figure, the rollers 4 as well as the shaft members 3 can be clearly seen. It is understood that the shaft members 3 serve as articulated link between the individual strap members 1 and, moreover, effect as bearing shaft members for the rollers 4.

Figure 10:
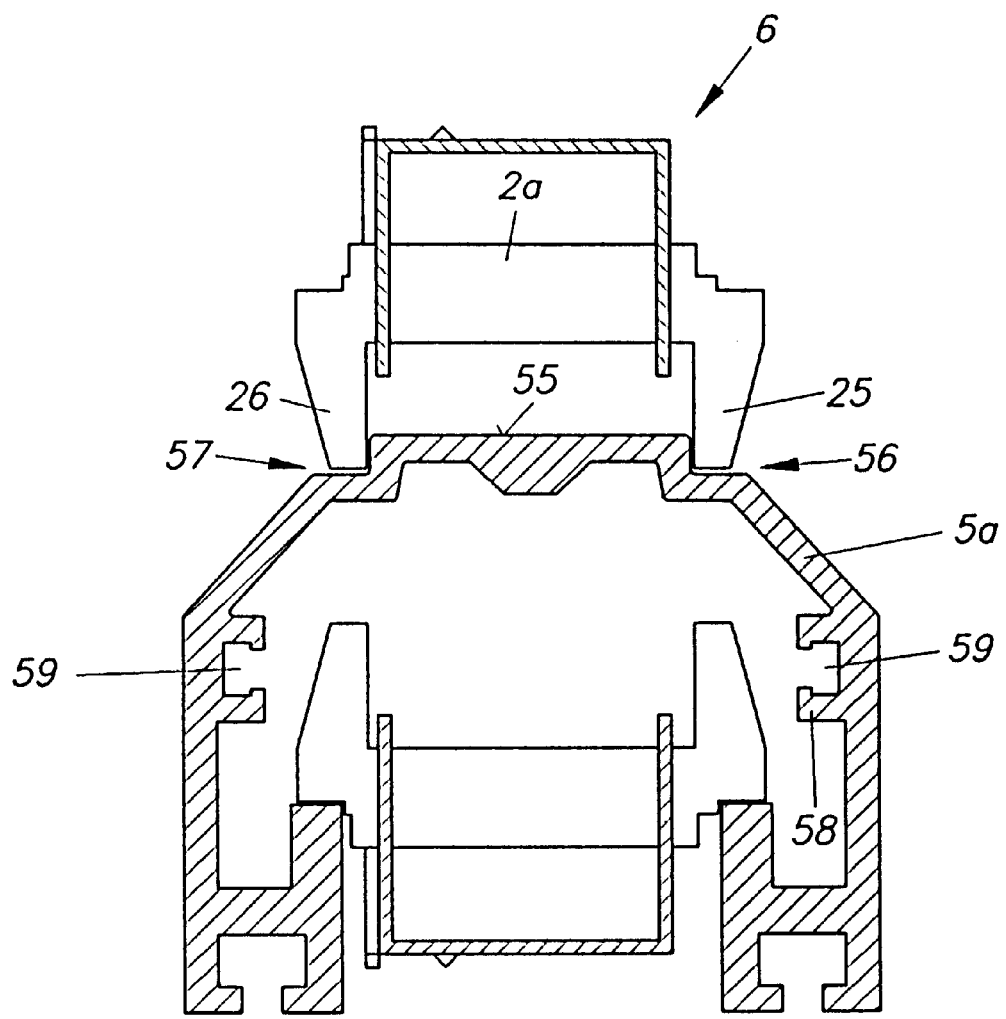
FIG. 10 shows a cross sectional view of another embodiment of a supporting rail and of the roller chain.

FIG. 10 shows a cross sectional view of another embodiment of a supporting rail member 5a and of the roller chain 6a, particularly of its guide elements 2a. In this embodiment, the supporting rail member 5a is not provided with a central guide groove (corresponding to the guide groove 54 in FIG. 9), but comprises an upper bearing surface 55 which is laterally delimited by two guide surfaces 56, 57 located at a lower level than the upper bearing surface 55. The guide elements 2a comprise two lateral guide arm members 25, 26 which laterally overlap the upper bearing surface 55 and extend downwards towards the guide surfaces 56, 57. At the top, the guide arm members 25, 26 are provided with sliding surfaces having the same purpose as explained in connection with the guide element 2 shown in FIG. 2a. Moreover, the supporting rail member 5a is provided with two additional T-shaped grooves 59. These grooves 59 can serve, for instance, for fixing thereto a support structure for the tail rollers 31 and 33, respectively. It is also possible to interconnect individual supporting rail members 5a with the help of these grooves 59.

Figure 11A:
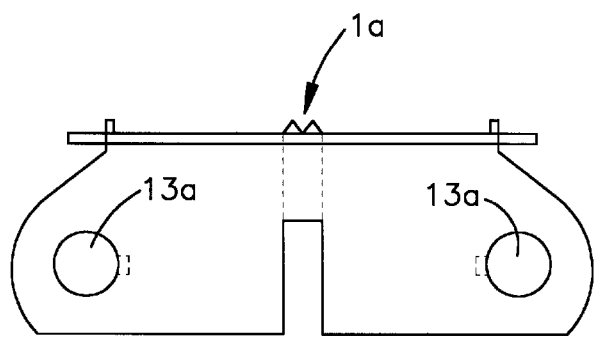
FIG. 11a shows a second embodiment of a single strap member for a roller chain in a side view.
Figure 11B:
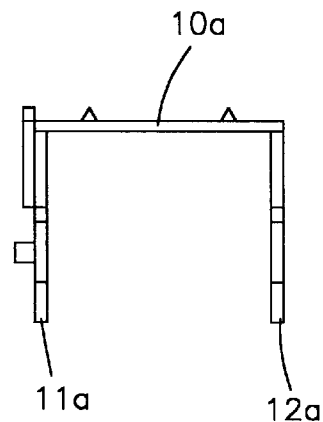
FIG. 11b shows a second embodiment of a single strap member for a roller chain in a front view.
Figure 11C:
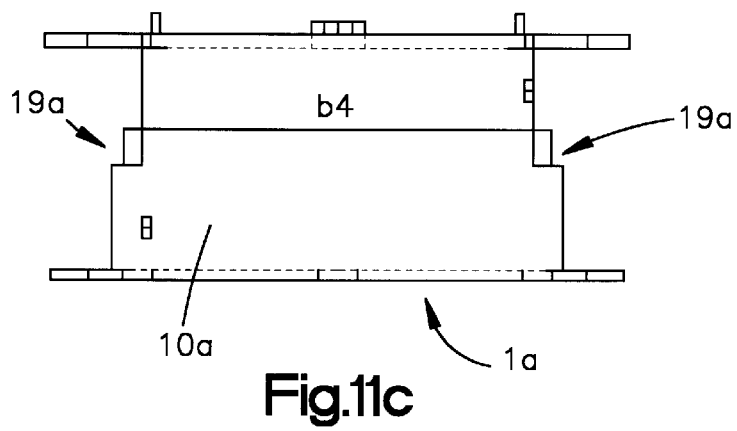
FIG. 11c shows a second embodiment of a single strap member for a roller chain in a top view.

FIGS. 11a, 11b, and 11c show a second embodiment of an individual strap member 1a for a roller chain in a side view, in a front view and in a top view. This strap member la is of similar design as the strap member 1 shown in FIGS. 1a, 1b, and 1c and discussed in connection therewith; it: comprises a base portion 10a with two end portions which are provided each with a graduation 19a. Moreover, the two leg portions 11a, 12a are designed such that the strap members 1a can be assembled to a chain without the need that the base portion 10a has to be provided with a slot 16 for receiving a leg portion 12 (as shown in FIG. 1c). A chain comprising such strap members 1a can take up lateral forces arising between adjacent strap members 1a due to the provision of the graduations 19a in the end regions of the base portion 10a.

Figure 12:
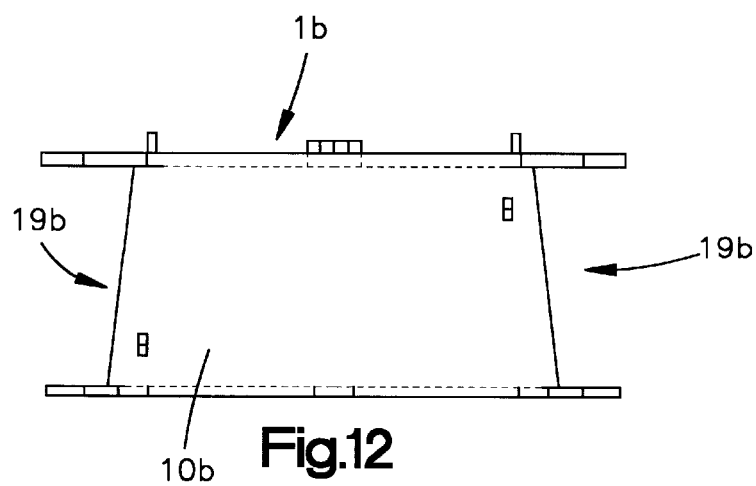
FIG. 12 shows a third embodiment of a single strap member for a roller chain in a top view.

In place of the graduations 19a, it is possible to provide the base portion 10b with oblique end edges 10b, as it is shown in FIG. 12. The mean length of the corresponding base portion 10a and 10b, respectively, is somewhat shorter than the distance between the centers of two consecutive rollers and bores 13a, respectively. The expression "mean length" should be understood in connection with FIG. 11c such that it is the length b4 of the base portion 10a measured at the centers of the two graduations 19a and, in connection with FIG. 12, the length of the base portion 10b measured along the longitudinal centerline of the base portion 10b.

To sum up, it should be noted that a chain conveyor comprising the previously described characteristics, as compared to a chain conveyor according to the prior art, presents a lower overall friction, is less susceptible to contamination and can be manufactured in a simpler and more cost effective way.

The field of application of such a chain conveyor is not limited exclusively to rack storage assemblies. Rather, it can universally put on in many other applications. Moreover, such a chain conveyor is equally suitable to be mounted horizontally or slightly inclined. Finally, it could be possible to provide a driving mechanism to autonomously operate its roller chains.

What is claimed is:

1. A chain conveyor comprising a roller chain means and a supporting rail means for vertically supporting said roller chain means, said roller chain means including a plurality of roller members which are interconnected in an articulated manner by a plurality of strap members, further comprising means for laterally guiding said roller chain means with respect to said supporting rail means without carrying any tractive force, said means for laterally guiding said roller chain means comprising discrete guide elements which are located between said roller members, said guide elements being separate and apart from said strap members before assembly of said chain conveyor and fixedly connected to said strap members during assembly of said chain conveyor.

2. A chain conveyor according to claim 1 in which the top surface of said supporting rail means is provided with a longitudinally extending guide groove, and in which said guide means comprise cam means engaging said guide groove.

3. A chain conveyor according to claim 1 in which said supporting rail means comprises an upper bearing surface means which is laterally delimited by two guide surface means located at a lower level than said upper bearing surface means, and in which said guide means comprises two lateral guide arm members which laterally overlap said upper bearing surface means and extend downwards towards said guide surface means.

4. A chain conveyor according to claim 1 in which said roller means are mounted in said strap members by means of shaft means inserted into bores provided in said strap members, whereby said strap members are provided with plastically deformable fixing means located in the region of said bores and adapted to lock said shaft means when said fixing means are plastically deformed.

5. A chain conveyor according to claim 1 in which the two free ends of said roller chain means are interconnected by a belt means to form an endless conveyor means, whereby the length of said roller chain means amounts to not more than 60% of the total length of said endless conveyor means.

6. A chain conveyor according to claim 1 in which said guide means consists of a plastic material having good self-lubricating properties.

7. A chain conveyor according to claim 1 in which said guide means comprises a central guide cam means as well as two lateral supporting pin means, whereby one of said lateral supporting pin means is longer than the other one of said lateral supporting pin means by an amount corresponding to the thickness of the walls of said leg members of said strap members.

8. A chain conveyor according to claim 1, further comprising deflection means located in the region of the two ends of said supporting rail means and adapted to deflect said roller chain means, thereby separating said roller chain means into an upper run and a lower run, said supporting rail means including a hollow space with an open bottom for receiving said lower run of said roller chain means at least partially, said guide means protruding from said strap members of said upper run both downwards towards said guide rail means and laterally on both sides, whereby a portion of said guide means protruding said strap members downwards is adapted for laterally guiding said upper run of said roller chain means with respect to said supporting rail means, while other portions of said guide means laterally protruding said strap, members are adapted for laterally guiding and vertically supporting said lower run of said roller chain means which is at least partially received in said hollow space.

9. A chain conveyor according to claim 8 in which two auxiliary rail means are provided in the interior of said hollow space of said supporting rail means, the inside distance between said two auxiliary rail means being greater than the width of said strap members, but smaller than the width of said guide means, such that the portions of said guide means which laterally protrude said guide means vertically support said lower run of said roller chain means on said auxiliary rail means.

10. A chain conveyor according to claim 1 in which said roller chain means comprises a plurality of uniform strap members.

11. A chain conveyor according to claim 10 in which consecutive strap members are rotated by 180° with respect to each other around their z-axis and laterally offset to each other by an amount corresponding to the thickness of the walls of said leg members.

12. A chain conveyor according to claim 1 in which said strap members are constructed of a first material and said guide elements are constructed of a second material different from said first material.

13. A chain conveyor according to claim 12 in which said roller chain means comprises a plurality of uniform strap members and said means for laterally guiding said roller chain means comprises a plurality of uniform guide elements.

14. A chain conveyor according to claim 1 in which said strap members, as seen in a cross sectional view, are of generally U-shaped design, each strap member comprising two leg members as well as a base portion located therebetween, whereby said base portions of said strap members of said upper run of said roller chain means are directed towards the top.

15. A chain conveyor according to claim 14 in which the two end portions of said base portion of said strap member comprise a graduation or oblique edges.

16. A chain conveyor according to claim 14 in which the mean length of said base portion of said strap member at least approximately corresponds to the distance between the centers of two consecutive roller members, whereby said base portion of said strap members constitutes an upper cover of said roller chain means to protect both the supporting rail means and the roller means from contamination.

17. A chain conveyor according to claim 14 in which the top of said base portions of said strap members serves as a supporting surface for goods to be received and displaced by the chain conveyor and is provided with means for increasing the horizontal power transmission between said goods and said roller chain means.

18. A chain conveyor according to claim 14 in which said base portions of said strap members are provided with two slots running along one of said leg members, whereby the width of said slots is greater than the thickness of the wall of said leg members.

19. A chain conveyor according to claim 14 in which both of said two leg members of said strap members are provided with recesses adapted to receive said guide means and keep said guide means in place.

20. A chain conveyor according to claim 19 in which said guide means are provided with snap-in or clamping means adapted to securely fix said guide means to said strap members.

* * * * *